US012800371B2

(12) United States Patent
Eskerod Madsen

(10) Patent No.: US 12,800,371 B2
(45) **Date of Patent: *Nov. 17, 2026**

(54) FLOW SENSOR AND METHOD USING TEMPERATURE TO IMPROVE MEASUREMENTS FOR LOW RATES

(71) Applicant: REMONI A/S, Skanderborg (DK)

(72) Inventor: Bo Eskerod Madsen, Østbirk (DK)

(73) Assignee: REMONI A/S, Skanderborg (DK)

(*) Notice: Subject to any disclaimer, the term of this patent is extended or adjusted under 35 U.S.C. 154(b) by 233 days.

This patent is subject to a terminal disclaimer.

(21) Appl. No.: 18/395,972

(22) Filed: Dec. 26, 2023

(65) Prior Publication Data

US 2024/0151568 A1 May 9, 2024

Related U.S. Application Data

(63) Continuation of application No. PCT/DK2022/050134, filed on Jun. 17, 2022.

(30) Foreign Application Priority Data

Jun. 27, 2021 (DK) ........................... PA 2021 00690
Jan. 19, 2022 (DK) ........................... PA 2022 00049

(51) Int. Cl.
*G01F 1/66* (2022.01)
*G01F 1/667* (2022.01)
(Continued)

(52) U.S. Cl.
CPC .............. *G01F 1/668* (2013.01); *G01F 1/662* (2013.01); *G01F 1/667* (2013.01); *G01F 1/6847* (2013.01);
(Continued)

(58) Field of Classification Search
CPC ... G01F 1/00; G01F 1/66; G01F 1/662; G01F 1/667; G01F 1/668; G01F 1/68;
(Continued)

(56) References Cited

U.S. PATENT DOCUMENTS

| | | | |
|---|---|---|---|
| 6,871,148 | B2 | 3/2005 | Morgen |
| 7,062,976 | B2 | 6/2006 | Gysling |

(Continued)

FOREIGN PATENT DOCUMENTS

| | | | |
|---|---|---|---|
| CA | 2780564 | A1 | 5/2011 |
| CN | 204421986 | U | 6/2015 |

(Continued)

*Primary Examiner* — Nguyen Q. Ha
(74) *Attorney, Agent, or Firm* — Schmeiser Olsen PLLC

(57) ABSTRACT

A flow sensor configured to measure the flow of a fluid flowing through a tubular structure comprises a first detection unit that is configured to detect flows above a predefined lower flow level representing the lowest flow that can be measured by the first detection unit and a second detection unit that is configured to estimate the flow below the lower flow level (on the basis of the temperature difference between the surroundings and a fluid). The second detection unit is configured to estimate the flow below the lower flow level on the basis of one or more measurements made in a flow-calibration-area in which the flow sensor can detect the flow and in which the flow depends on the temperature difference.

20 Claims, 7 Drawing Sheets

(51) Int. Cl.

| | |
|---|---|
| ***G01F 1/68*** | (2006.01) |
| ***G01F 1/684*** | (2006.01) |
| ***G01F 1/688*** | (2006.01) |
| ***G01F 7/00*** | (2006.01) |
| ***G01F 15/14*** | (2006.01) |

(52) U.S. Cl.
CPC .............. *G01F 1/6882* (2013.01); *G01F 7/00* (2013.01); *G01F 15/14* (2013.01)

(58) Field of Classification Search
CPC ........ G01F 1/6847; G01F 1/6882; G01F 7/00; G01F 15/14
See application file for complete search history.

(56) References Cited

U.S. PATENT DOCUMENTS

| | | | |
|---|---|---|---|
| 7,165,464 | B2 | 1/2007 | Gysling |
| 7,197,938 | B2 | 4/2007 | Gysling |
| 7,343,818 | B2 | 3/2008 | Gysling |
| 7,437,946 | B2 | 10/2008 | Gysling |
| 7,526,966 | B2 | 5/2009 | Gysling |
| 7,673,525 | B2 | 3/2010 | Huang |
| 8,224,621 | B2 | 7/2012 | Ajay et al. |
| 8,489,342 | B2 | 7/2013 | Dugger et al. |
| 8,714,030 | B1 | 5/2014 | Liu |
| 8,820,147 | B2 | 9/2014 | Sinha |
| 8,910,530 | B2 | 12/2014 | Gaarder |
| 9,354,094 | B2 | 5/2016 | Sinha |
| 9,410,833 | B1 | 8/2016 | Leaders et al. |
| 9,851,230 | B2 | 12/2017 | Gestner |
| 10,036,763 | B2 | 7/2018 | Hies |
| 10,240,955 | B2 | 3/2019 | Gestner |
| 10,295,385 | B2 | 5/2019 | Rick |
| 10,330,508 | B2 | 6/2019 | Sathyanarayana |
| 10,352,745 | B2 | 7/2019 | Easey |
| 10,527,516 | B2 | 1/2020 | Banerjee et al. |
| 10,598,684 | B2 | 3/2020 | Hies |
| 10,704,979 | B2 | 7/2020 | Bailey |
| 10,876,871 | B2 | 12/2020 | Head |
| 10,928,414 | B2 | 2/2021 | Hies |
| 10,942,080 | B2 | 3/2021 | Bailey et al. |
| 11,137,276 | B1 | 10/2021 | Helfenstein et al. |
| 11,193,805 | B2 | 12/2021 | Gestner |
| 11,209,333 | B2 | 12/2021 | Bailey |
| 11,333,676 | B2 | 5/2022 | Hies |
| 11,624,639 | B2 | 4/2023 | Sarkissian |
| 11,674,832 | B2 | 6/2023 | Head |
| 11,920,964 | B2 | 3/2024 | Alcorn |
| 11,982,559 | B2 | 5/2024 | Helle |
| 11,982,642 | B2 | 5/2024 | Chang |
| 2011/0239730 | A1 | 10/2011 | Brakel et al. |
| 2012/0206272 | A1 | 8/2012 | Borlee |
| 2013/0081477 | A1 | 4/2013 | Gotou et al. |
| 2013/0276549 | A1 | 10/2013 | Gaarder |
| 2015/0000420 | A1 | 1/2015 | Ramsay |
| 2016/0320245 | A1 | 11/2016 | Herbron |
| 2017/0082471 | A1 | 3/2017 | Ramanan et al. |
| 2018/0010978 | A1 | 1/2018 | Bailey |
| 2018/0058891 | A1 | 3/2018 | Easey et al. |
| 2018/0291594 | A1 | 10/2018 | Hammond et al. |
| 2019/0032477 | A1 | 1/2019 | Huang |
| 2019/0154539 | A1 | 5/2019 | Banerjee et al. |
| 2019/0310119 | A1* | 10/2019 | Easey ................... G01F 1/6847 |
| 2020/0049544 | A1 | 2/2020 | Mayle et al. |
| 2020/0326216 | A1 | 10/2020 | Sarkissian et al. |
| 2021/0372837 | A1 | 12/2021 | Alcorn et al. |
| 2022/0357190 | A1 | 11/2022 | Reepmeyer |
| 2022/0364894 | A1 | 11/2022 | Reepmeyer |
| 2023/0122613 | A1 | 4/2023 | Ball |
| 2023/0251118 | A1 | 8/2023 | Modderman |
| 2023/0273058 | A1 | 8/2023 | Head |
| 2023/0324209 | A1 | 10/2023 | Sarkissian |

FOREIGN PATENT DOCUMENTS

| | | | |
|---|---|---|---|
| CN | 104596603 | B | 8/2017 |
| EP | 2840362 | A1 | 2/2015 |
| EP | 2739942 | B1 | 4/2016 |
| EP | 3175205 | B1 | 1/2020 |
| EP | 3234513 | B1 | 1/2020 |
| EP | 3243080 | B1 | 7/2020 |
| EP | 3428583 | B1 | 8/2020 |
| EP | 3714249 | A1 | 9/2020 |
| EP | 3256862 | B1 | 3/2021 |
| EP | 3918284 | A1 | 12/2021 |
| EP | 4224118 | A1 | 8/2023 |
| EP | 4244583 | A1 | 9/2023 |
| EP | 4246098 | A2 | 9/2023 |
| EP | 3479075 | B1 | 10/2023 |
| EP | 3821208 | B1 | 2/2024 |
| EP | 4067833 | B1 | 2/2024 |
| EP | 4367484 | A1 | 5/2024 |
| GB | 2289760 | A | 11/1995 |
| GB | 2572705 | A | 10/2019 |
| GB | 2574116 | A | 11/2019 |
| JP | H08304135 | A | 11/1996 |
| JP | 2007057452 | A | 3/2007 |
| JP | 2009288085 | A | 12/2009 |
| JP | 2016109551 | A | 6/2016 |
| JP | 2020106358 | A | 7/2020 |
| WO | 2011020143 | A1 | 2/2011 |
| WO | 2020035694 | A1 | 2/2020 |

* cited by examiner

Fig. 3A
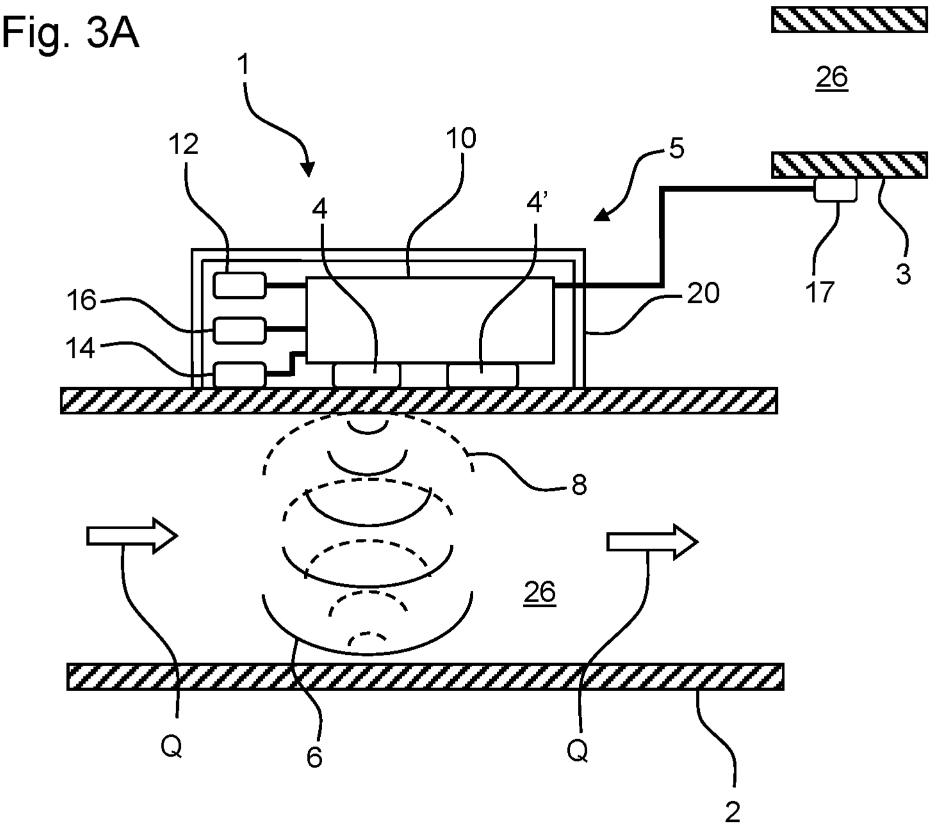
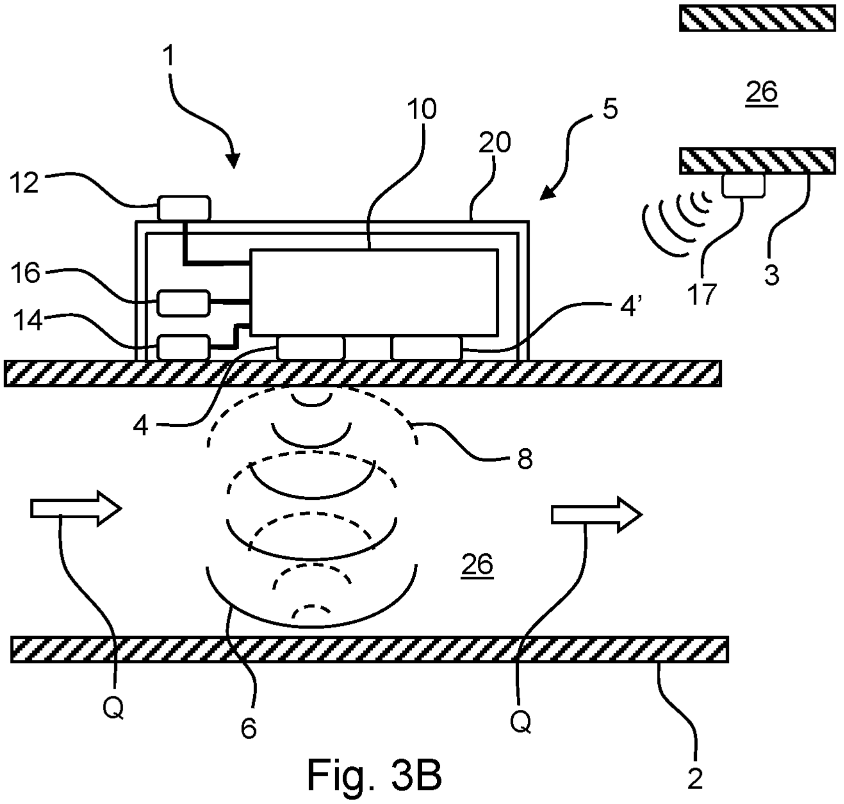
Fig. 3B

Fig. 4A
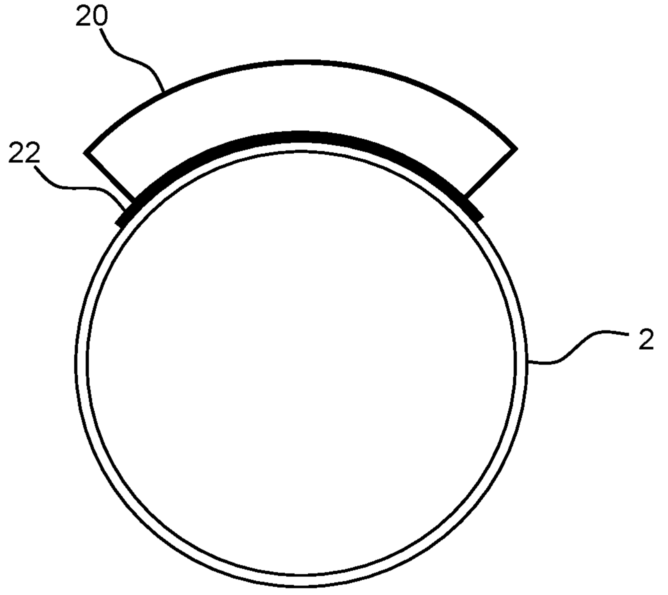
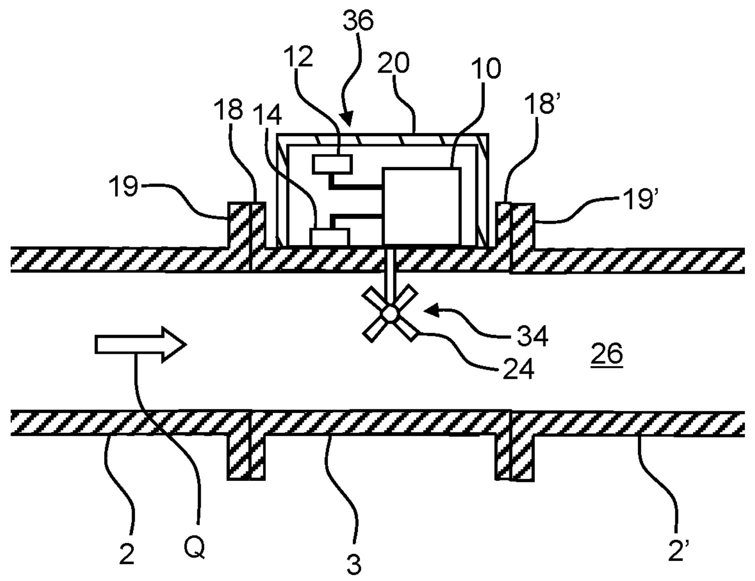
Fig. 4B

Fig. 5A
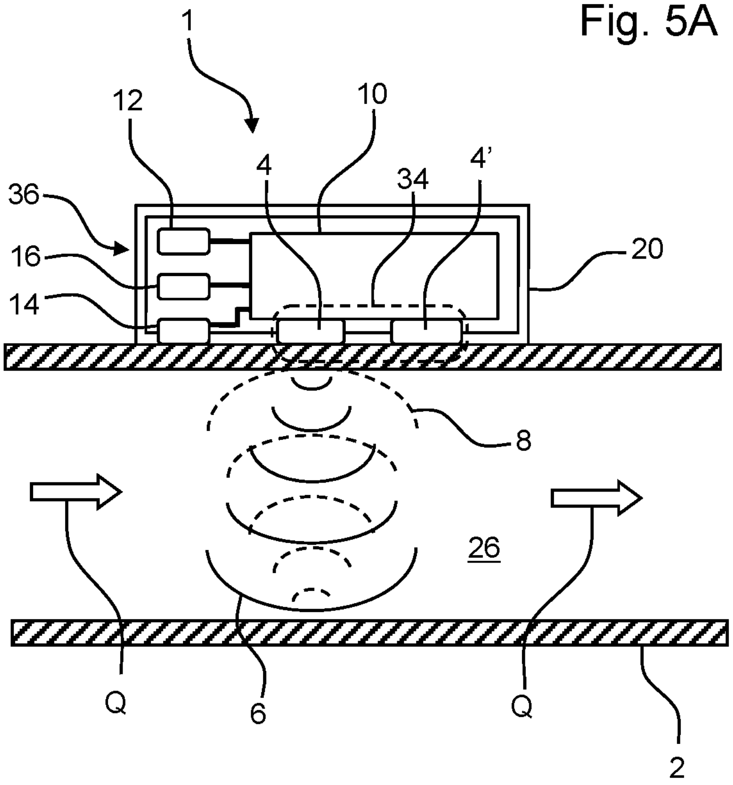
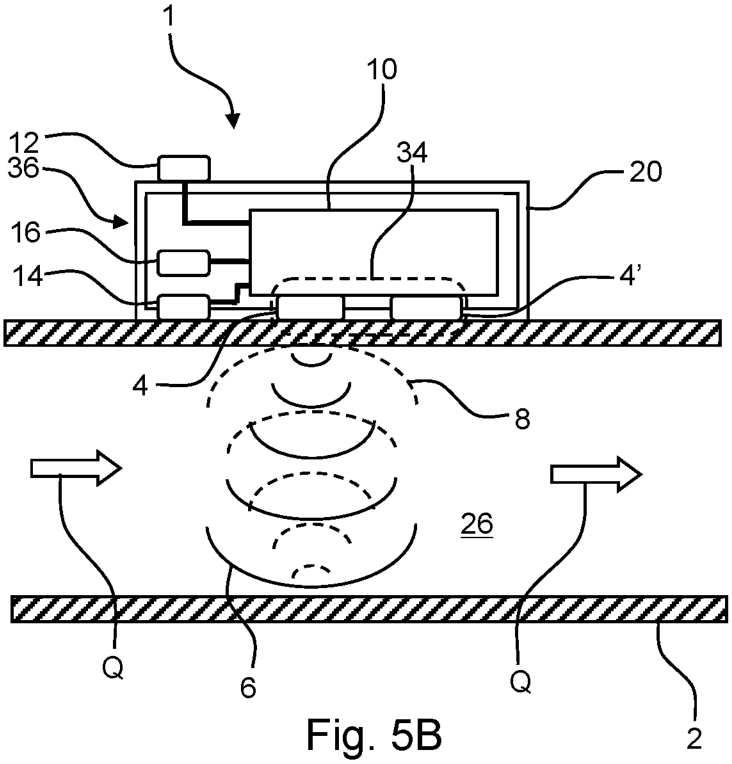
Fig. 5B

FLOW SENSOR AND METHOD USING TEMPERATURE TO IMPROVE MEASUREMENTS FOR LOW RATES

CROSS-REFERENCE TO RELATED APPLICATIONS

This application is a continuation under 35 U.S.C. 111 of International Patent Application No. PCT/DK2022/050134, filed Jun. 17, 2022, which claims the benefit of and priority to Danish Application Nos. PA 2021 00690, filed Jun. 27, 2021 and PA 2022 00049, filed Jan. 19, 2022, each of which is hereby incorporated by reference in its entirety.

FIELD OF INVENTION

The present invention relates to flow sensors in general and in particular to clamp-on ultrasonic flow sensors.

BACKGROUND

Flow measurement is widely used for measuring flow in industry, buildings and utility grids. Flow can be detected by using various types of flow sensors. The prior art flow sensors include mechanical flow sensors and ultrasonic flow sensors. Ultrasonic flow sensors are mainly used in two versions, namely delta-time-of-flight for measuring on pure fluids (water, gas, industry liquids, etc.) and Doppler effect for measuring fluids containing many particles (slurry, liquids with air bubbles, etc.).

All prior art flow sensors, however, have a predefined non-zero lower flow level representing the lowest flow that can be measured using the flow sensor. Below the lower flow level, no flow can be detected. This is a major drawback. Accordingly, it would be desirable to be able to provide a solution to this problem.

Since the prior art flow sensors fail to detect lower flow rates (aka speed or volume), relative low flow rates are often difficult or impossible to detect. At the same time, the prior art delta-time-of-flight flow sensors are designed for detecting flow in a homogeneous medium, leading to measurement error if the medium is inhomogeneous. It will therefore lead to e.g.:

A. Measurement error.

B. Limitations against detecting small leakages and similar, which can be damaging to e.g. the building or production where the sensor is installed.

C. Difficulties in detecting no-flow (the fluid stands still in the pipe), which is needed to identify the off-set of the sensor.

Thus, there is a need for a method and a flow sensor which reduces or even eliminates the above-mentioned disadvantages of the prior art.

BRIEF DESCRIPTION

A flow sensor according to the present disclosure is a flow sensor configured to measure the flow of a fluid flowing through a tubular structure, wherein the flow sensor comprises a first detection unit that is configured to detect flows above a predefined lower flow level representing the lowest flow that can be measured by using the first detection unit, wherein the flow sensor comprises a second detection unit that comprises:

- a first temperature sensor arranged and configured to detect the temperature of the surroundings (the ambient temperature);

- a second temperature sensor arranged and configured to detect the temperature of the fluid;
- a data processor connected to the temperature sensors, wherein the second detection unit is configured to estimate the flow below the lower flow level on the basis of the temperature difference between the surroundings and a fluid, wherein the temperature difference is measured by the first temperature sensor and the second temperature sensor, wherein the second detection unit is configured to estimate the flow below the lower flow level on the basis of one or more measurements made in a flow-calibration-area, in which-flow-calibration-area the flow sensor can detect the flow that depends on the temperature difference, wherein the one or more measurements made in the flow-calibration-area are used to determine one or more parameters required to determine how the flow depends on the temperature difference in the flow area below the flow-calibration-area.

Hereby, it is possible to provide a sensor that can detect flows in a larger flow range than the prior art flow sensors. A flow sensor according to the present disclosure can in particular detect flows below the lower flow level.

A flow sensor according to the present disclosure is a flow sensor configured to measure the flow of a fluid. In an embodiment, the fluid is a liquid. In an embodiment, the fluid is a water-containing liquid. In an embodiment, the fluid is a gas.

The fluid is flowing through a tubular structure. In an embodiment, the tubular structure is a pipe. In an embodiment, the tubular structure is a hose. In an embodiment, the tubular structure is a container. In an embodiment, the tubular structure is a box.

The flow sensor comprises a first detection unit that is configured to detect flows above a predefined lower flow level representing the lowest flow that can be measured using the first detection unit. The first detection unit may be a structure of a positive displacement meter that requires fluid to mechanically displace components of the mechanical flow detection unit in order to provide flow measurements. In an embodiment, the first detection unit is a turbine. In an embodiment, the first detection unit is an impeller.

The first detection unit may be a structure of an ultrasonic flow sensor. In an embodiment, the first detection unit comprises one or more ultrasonic transducers.

In an embodiment, the first detection unit comprises one or more ultrasonic transmitters and one or more ultrasonic receivers.

The flow sensor comprises a second detection unit that comprises:

- a first temperature sensor arranged and configured to detect the temperature of the surroundings (the ambient temperature);
- a second temperature sensor arranged and configured to detect the temperature of the fluid;
- a data processor connected to the temperature sensors.

The data processor may be a micro-processor.

The second detection unit is configured to estimate the flow below the lower flow level on the basis of the temperature difference between the surroundings and a fluid, wherein the temperature difference is measured by the first temperature sensor and the second temperature sensor.

In an embodiment, the second detection unit is configured to estimate the flow below the lower flow level on the basis of a single measurement made in a flow-calibration-area. In some situations a single measurement may be sufficient to determine the one or more parameters required to determine how the flow depends on the temperature difference in the flow area below the flow-calibration-area.

In an embodiment, the second detection unit is configured to estimate the flow below the lower flow level on the basis of two or more measurements made in a flow-calibration-area.

In an embodiment, the second detection unit contains a storage containing information about how the flow depends on the temperature difference, wherein the data processor is configured to access and use said information in such a manner that the data processor can determine the flow on the basis of the temperature difference. In the flow range below the lower flow level, the second detection unit can detect the flow on the basis of the temperature difference value. This can be accomplished, when the relationship between the flow and the temperature difference is known and stored in the storage.

The second detection unit is configured to estimate the flow below the lower flow level on the basis of one or more measurements made in a flow-calibration-area, in which flow-calibration-area the flow sensor can detect the flow that depends on the temperature difference, wherein the one or more measurements made in the flow-calibration-area are used to determine one or more parameters required to determine how the flow depends on the temperature difference in the flow area below the flow-calibration-area. Accordingly, the flow sensor itself is used to calculate one or more parameters that allow the flow sensor to estimate low flows (below the lower flow level) on the basis of the detected temperature difference.

In an embodiment, the flow sensor is configured to regularly or continuously:

- carry out the one or more measurements in a flow-calibration-area and
- update the one or more parameters required to determine how the flow depends on the temperature difference in the flow-calibration-area and in the flow area below the flow-calibration-area.

Hereby, it is possible to provide reliable flow measurements and on a regular basis adjust the parameters according to changes of the ambient conditions (e.g. an increased ventilation). The flow sensor is configured to automatically perform a required number of measurements in the flow-calibration-area and calculate and update the one or more parameters required to determine how the flow depends on the temperature difference in the flow-calibration-area and in the flow area below the flow-calibration-area.

In an embodiment, the term "regularly or continuously" has to be understood as once every second, in which attempts are made to provide one or more measurements in the flow-calibration-area.

In an embodiment, the term "regularly or continuously" has to be understood as once every 5 seconds, in which attempts are made to provide one or more measurements in the flow-calibration-area.

In an embodiment, the term "regularly or continuously" has to be understood as once every 10 seconds, in which attempts are made to provide one or more measurements in the flow-calibration-area.

In an embodiment, the term "regularly or continuously" has to be understood as once every 30 seconds, in which attempts are made to provide one or more measurements in the flow-calibration-area.

In an embodiment, the term "regularly or continuously" has to be understood as once every minute, in which attempts are made to provide one or more measurements in the flow-calibration-area.

In an embodiment, the term "regularly or continuously" has to be understood as once every 2 minutes, in which attempts are made to provide one or more measurements in the flow-calibration-area.

In an embodiment, the term "regularly or continuously" has to be understood as once every 5 minutes, in which attempts are made to provide one or more measurements in the flow-calibration-area.

In an embodiment, the term "regularly or continuously" has to be understood as once every 15 minutes, in which attempts are made to provide one or more measurements in the flow-calibration-area.

In an embodiment, the term "regularly or continuously" has to be understood as once every 30 minutes, in which attempts are made to provide one or more measurements in the flow-calibration-area.

In an embodiment, the term "regularly or continuously" has to be understood as once every hour, in which attempts are made to provide one or more measurements in the flow-calibration-area.

When attempts are made to provide one or more measurements in the flow-calibration-area it is:

a) in some situations possible to provide useful measurements (this is possible if the flow is within the flow-calibration-area) or b) in some situations not possible to provide useful measurements (this is the case if the flow is not within the flow-calibration-area).

In an embodiment, the dependency between the flow (Q) and the temperature difference ($\Delta T_{sf}$) is defined by the following equations:

$$\Delta T_{sf}(Q) = \Delta T_B(1 - e^{-C_1 Q}) \text{ or } Q(\Delta T_{sf}) = \frac{-1}{C_1}\ln\left(1 - \frac{\Delta T_{sf}}{\Delta T_B}\right)$$

where $C_1$ is a constant and $\Delta T_B$ is a temperature difference corresponding to a base flow level. In FIG. 8, the base flow level $Q_B$ is illustrated.

These equations have two unknowns: the temperature difference $\Delta T_B$ corresponding to the base flow level $Q_B$ and the constant $C_1$.

Accordingly, two measurements made in the flow-calibration-area provide sufficient information to determine the dependency between the flow (Q) and the temperature difference ($\Delta T_{sf}$).

In an embodiment, the second detection unit is integrated in the first detection unit. In an embodiment, the second detection unit and the first detection unit are provided as separated units.

In an embodiment, the second detection unit is communicatively connected to a storage or an external device containing information about how the flow depends on the temperature difference, wherein the data processor is configured to access and use said information in such a manner that the data processor can determine the flow on the basis of the temperature difference.

In an embodiment, the second temperature sensor is arranged and configured to detect the temperature of the fluid by measuring a temperature at the outside of the tubular structure. Hereby it is possible to provide the flow sensor as a clamp-on type flow sensor that can be mounted on the outside of the tubular structure (e.g. a pipe). Accordingly, there is no need for bringing the second temperature sensor into direct contact with the fluid.

In an embodiment, the data processor and the second temperature sensor are arranged inside a housing. Hereby, it is possible to provide a simple, easy mountable and robust flow sensor.

In an embodiment, the first temperature sensor is arranged in the housing. Hereby, all components of the flow sensor can be provided in a single housing.

In an embodiment, the first temperature sensor is arranged outside the housing. Hereby, it is possible to take into consideration the heat transfer caused by convection.

In an embodiment, the second detection unit comprises an intermediate temperature sensor arranged and configured to detect an intermediate temperature of a position inside the housing, wherein said position is expected to have a temperature between the ambient temperature and the temperature of the fluid. Hereby, it is possible to provide additional information and thus provide an improved estimation of the flow in the low flow range.

In an embodiment, the flow sensor is a clamp-on flow sensor configured to measure the flow of the fluid from outside the tubular structure.

In an embodiment, the flow sensor is an ultrasonic flow sensor and the first detection unit comprises at least one ultrasonic transducer arranged to transmit ultrasonic waves and at least one ultrasonic transducer arranged to receive ultrasonic waves.

In an embodiment, the data processor is configured to:

calculate the expected speed of sound as a function of the detected temperature of the fluid) and compare the expected speed of sound as a function of the detected temperature of the fluid with a detected value of the speed of sound and calculate a corrected value of the density and the flow if the detected value of the speed of sound does not correspond to the expected speed of sound as a function of the detected temperature of the fluid.

Hereby, it is possible to improve the flow measurement accuracy in the flow range above the lower flow level.

The expected speed of sound depends on the detected temperature of the fluid, and can be calculated by using a predefined relationship between the speed of sound as a function of the temperature of the fluid. If the fluid is pure water, by way of example, the relationship between the expected speed of sound as a function of the detected temperature of the fluid would be defined as illustrated in FIG. 7.

If the fluid is different from pure water (e.g. water containing salt, sugar or another substance), a different predefined relationship between the expected speed of sound as a function of the detected temperature of the fluid can be used.

The expected speed of sound can be compared with a detected value of the speed of sound simply by detecting the speed of sound and making the comparison. The detection can be carried out using the following formula (16):

$$c = \frac{L}{2}\frac{t_2 + t_1}{t_2 t_1} \tag{16}$$

where c is the speed of sound, L is the distance the sound signal travels and $t_1$ and $t_2$ are the transit time for the sound signal transmitted and reflected, respectively.

The corrected value of the density and the flow is calculated if the detected value of the speed of sound does not correspond to the expected speed of sound. The corrected value of the density can be calculated using the following equation (18):

$$c = \sqrt{\frac{K}{\rho}} \Rightarrow \rho = \sqrt{\frac{K^2}{c^2}}, \tag{18}$$

where K is the Bulk Modulus of Elasticity of the fluid and ρ is the density of the fluid.

In an embodiment, the flow sensor is configured to calculate a corrected value of the specific heat capacity of the fluid if the detected value of the speed of sound c does not correspond to the expected speed of sound c as a function of the detected temperature of the fluid. Hereby, it is possible to apply the flow sensor to provide a heat energy meter having an improved accuracy. Using a corrected value of the specific heat capacity of the fluid will ensure that the heat energy meter delivers the most accurate measurements.

In an embodiment, the data processor is configured to calculate the expected speed of sound as a function of the detected temperature of the fluid.

In an embodiment, the flow sensor is configured to automatically calculate the distance L that the transmitted ultrasonic waves and received ultrasonic waves travel in the fluid on the basis of a detected value of the speed of sound c and the measured time-of-flight. Hereby, it is possible to measure the flow in a pipe without knowing the exact dimensions of the pipe. It is also possible to perform accurate measurements, even if sediments are provided at an inside surface of a pipe over time.

A method according to the present disclosure is a method for measuring the flow of a fluid flowing through a tubular structure using a first detection unit that is configured to detect flows above a predefined lower flow level representing the lowest flow that can be measured using the first detection unit, wherein the method comprises the steps of applying a second detection unit to:

detect the temperature of the surroundings (the ambient temperature) by a first temperature sensor;

detect the temperature of the fluid by a second temperature sensor;

estimate the flow below the lower flow level on the basis of the temperature difference between the surroundings and a fluid measured by the first temperature sensor and the second temperature sensor, wherein the method comprises the following steps:

a) performing one or more flow measurements by the first detection unit in a flow-calibration-area, in which flow-calibration-area the flow sensor can detect the flow that depends on the temperature difference;

b) applying the one or more measurements to determine one or more parameters required to determine how the flow depends on the temperature difference in the flow area below the flow-calibration-area; and c) estimating the flow below the lower flow level on the basis of the one or more measurements made in the flow-calibration-area.

Hereby, the method enables flow measurement carried out in the lower flow ranges.

In an embodiment, the fluid is a liquid. In an embodiment, the fluid is a water-containing liquid. In an embodiment, the fluid is a gas.

In an embodiment, the method comprises the step of estimating the flow below the lower flow level on the basis of a single measurement made in the flow-calibration-area. In some situations a single measurement may be sufficient to determine the one or more parameters required to determine how the flow depends on the temperature difference in the flow area below the flow-calibration-area.

In an embodiment, the method comprises the step of estimating the flow below the lower flow level on the basis of two measurements made in the flow-calibration-area.

In an embodiment, the method comprises the step of estimating the flow below the lower flow level on the basis of more than two measurements made in the flow-calibration-area.

In an embodiment, the method comprises the following steps:

storing information about how the flow depends on the temperature difference;

using said information to determine the flow on the basis of the temperature difference.

Hereby, the stored information can be used to provide a flow estimation in a simple and reliable manner. The information may be stored in an external device. In an embodiment, the information is stored in a web-based service.

In an embodiment, the method comprises the step of regularly or continuously:

carrying out the one or more measurements in a flow-calibration-area; and updating the one or more parameters required to determine how the flow depends on the temperature difference in the flow-calibration-area and in the flow area below the flow-calibration-area.

Hereby, it is possible to provide reliable flow measurements and on a regular basis adjust the parameters according to changes of the ambient conditions (e.g. an increased ventilation). By automatically performing a required number of measurements in the flow-calibration-area and calculating and updating the one or more parameters required to determine how the flow depends on the temperature difference in the flow-calibration-area and in the flow area below the flow-calibration-area, it is possible to provide an improved method.

In an embodiment, the dependency between the flow (Q) and the temperature difference ($\Delta T_{sf}$) is defined by the following equations:

$$\Delta T_{sf}(Q) = \Delta T_B(1 - e^{-C_1 Q}) \text{ or } Q(\Delta T_{sf}) = \frac{-1}{C_1}\ln\left(1 - \frac{\Delta T_{sf}}{\Delta T_B}\right)$$

where $C_1$ is a constant and $\Delta T_B$ is a temperature difference corresponding to the base flow level.

In an embodiment, the method comprises the following steps:

storing in the second detection unit information about how the flow depends on the temperature difference;

using said information to determine the flow on the basis of the temperature difference.

Hereby, the stored information can be used to provide a flow estimation in a simple and reliable manner.

In an embodiment, the second temperature sensor is arranged and configured to detect the temperature of the fluid by measuring a temperature at the outside of the tubular structure. Hereby, the need for bringing a temperature sensor in contact with the fluid can be eliminated.

In an embodiment, the method is carried out by a flow sensor comprising a data processor, wherein the data processor and the second temperature sensor are arranged inside a housing.

In an embodiment, the method is carried out by using a flow sensor, in which the first temperature sensor is arranged in the housing.

In an embodiment, the method is carried out by using a flow sensor, in which the first temperature sensor is arranged outside the housing.

In an embodiment, the method comprises the step of detecting an intermediate temperature by an intermediate temperature sensor arranged in a position inside a housing that houses the second temperature sensor and the intermediate temperature sensor, wherein the intermediate temperature is expected to have a value between the ambient temperature and the temperature of the fluid.

In an embodiment, the method comprises the step(s) of measuring the density and/or the estimated inhomogeneity of the fluid prior to measuring the flow.

Hereby, it is possible to improve the flow measurements and take into account the density and/or inhomogeneity of the fluid.

In an embodiment, the method comprises the following steps:

performing one or more measurements on a sample of the fluid;

applying the one or more measurements to calculate the density and/or estimated inhomogeneity of the fluid prior to measuring the flow.

In an embodiment, the estimated inhomogeneity of the fluid corresponds to the content of one or more substrates in the fluid. The substrate may be one or more of the following substances: sugar, salt, ethylene glycol, glycerol and propylene glycol.

In an embodiment, the method is carried out by using a clamp-on flow sensor configured to measure the flow of the fluid from outside the tubular structure.

In an embodiment, the method is carried out by an ultrasonic flow sensor and the first detection unit comprises at least one ultrasonic transducer arranged to transmit ultrasonic waves and least one ultrasonic transducer arranged to receive ultrasonic waves.

In an embodiment, the method comprises the following steps:

calculating the expected speed of sound as a function of the detected temperature of the fluid;

comparing the expected speed of sound as a function of the detected temperature of the fluid with a detected value of the speed of sound; and calculating a corrected value of the density and the flow if the detected value of the speed of sound does not correspond to the expected speed of sound as a function of the detected temperature of the fluid.

Hereby, it is possible to improve the flow measurement accuracy in the flow range above the lower flow level.

In an embodiment, the method comprises the step of calculating a corrected value of the specific heat capacity of the fluid if the detected value of the speed of sound c does not correspond to the expected speed of sound c as a function of the detected temperature of the fluid. Hereby, it is possible to apply the flow sensor to provide a heat energy meter having an improved accuracy. Using a corrected value of the specific heat capacity of the fluid will ensure that the heat energy meter delivers the most accurate measurements.

In an embodiment, the method comprises the step of automatically calculating the distance L (that the transmitted ultrasonic waves and received ultrasonic waves travel in the fluid) on the basis of a detected value of the speed of sound c and the measured time of flight. Hereby, it is possible to measure the flow in a pipe without knowing the exact dimensions of the pipe. It is also possible to perform accurate measurements, even if sediments are provided at an inside surface of a pipe over time.

In an embodiment, the method comprises the step of estimating the heat energy in a heating system or a cooling system. Hereby, it is possible to provide an improved (more accurate) method of detecting heat energy in a heating system or a cooling system.

A heat energy meter according to the present disclosure is a heat energy meter comprising a sensor according to the present disclosure.

BRIEF DESCRIPTION OF THE DRAWINGS

Systems and methods will become more fully understood from the detailed description given herein below. The accompanying drawings are given by way of illustration only, and thus, they are not limitative. In the accompanying drawings:

FIG. 3A shows a schematic view of a flow sensor according to an embodiment;

FIG. 3B shows a schematic view of another flow sensor according to an embodiment;

FIG. 4A shows a schematic view of a clamp-on type flow sensor according to an embodiment mounted on the outside of a pipe;

FIG. 4B shows a schematic view of another flow sensor according to an embodiment;

FIG. 5A shows a schematic view of a flow sensor according to an embodiment;

FIG. 5B shows a schematic view of another flow sensor according to an embodiment;

DETAILED DESCRIPTION

Figure 1A:
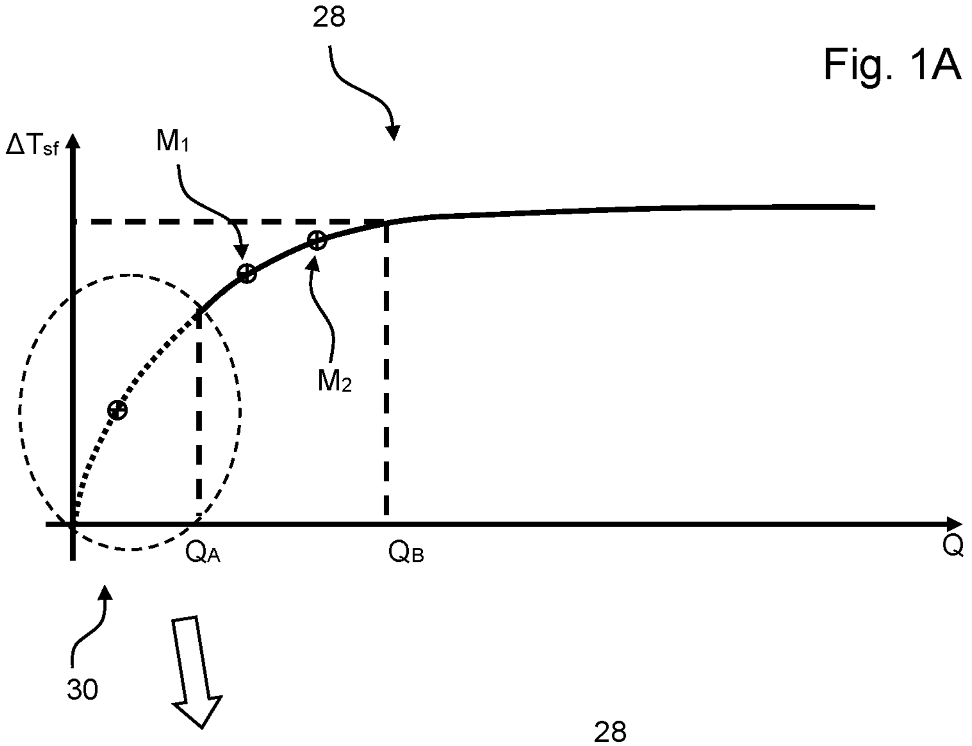
FIG. 1A shows a graph depicting the temperature difference between the surroundings and a fluid flowing through a pipe as a function of the fluid flow through the pipe.

Referring now in detail to the drawings for the purpose of illustrating embodiments of the present systems and methods, a graph 28 depicting the temperature difference $\Delta T_{sf}$ between the surroundings and a fluid flowing through a pipe as a function of the fluid flow Q through the pipe is illustrated in FIG. 1A.

It can be seen that the graph 28 (indicated with a solid line) extends above a lower flow level $Q_A$. The lower flow level $Q_A$ represents the lowest flow that can be measured using prior art flow sensors. Below this lower flow level $Q_A$, the graph 28, however, has been extrapolated. This lower area 30 is indicated with a dotted ellipse.

Figure 1B:
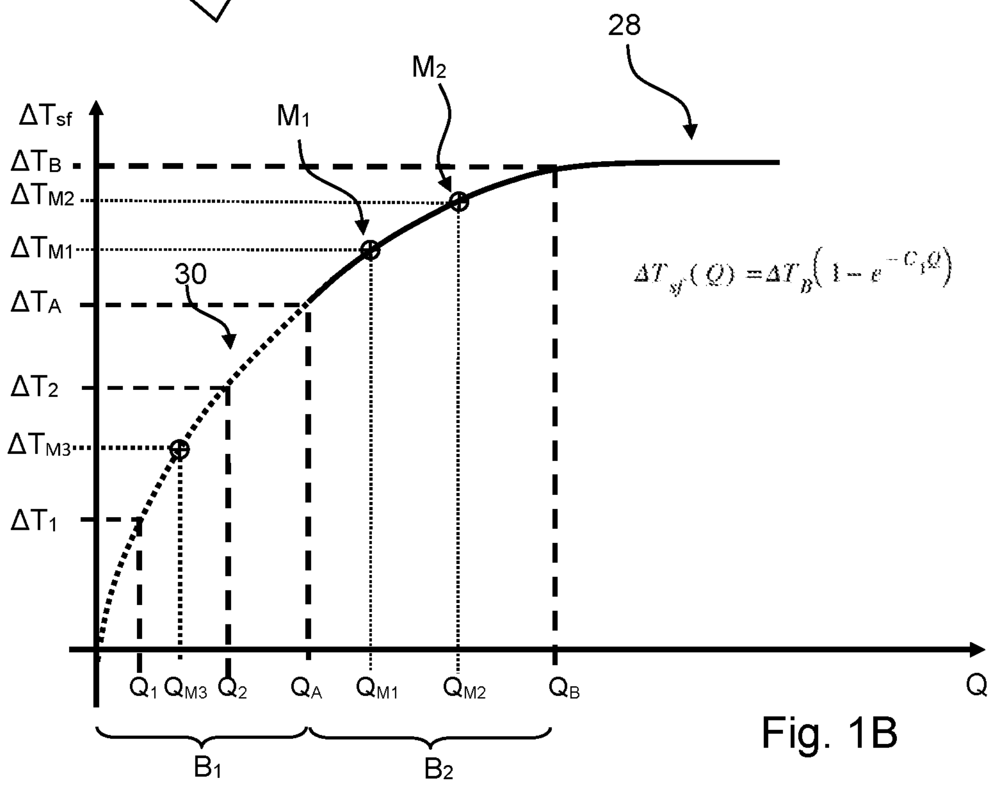
FIG. 1B shows the low flow portion of the graph shown in FIG. 1A.

FIG. 1B illustrates the low flow portion 30 of the graph 28 shown in FIG. 1A. While the prior art flow sensors are not capable of detecting flow below the lower flow level $Q_A$, the flow sensors and methods according to the present disclosure are capable of providing flow measurements below this lower flow level $Q_A$.

Above a base flow level $Q_B$ the graph 28 shows that the temperature difference $\Delta T_{sf}$ is constant and thus independent of the flow Q.

In the flow-calibration-area $B_2$ between the lower flow level $Q_A$ and the base flow level $Q_B$ the temperature difference $\Delta T_{sf}$ increases as a function of the flow Q. In this flow-calibration-area $B_2$, a first flow sensor measurement $M_1$ and a second flow sensor measurement $M_2$ are indicated.

It is possible to use one or more of the flow sensor measurements made in the flow-calibration-area $B_2$ to determine the parameters required to determine how the flow Q depends on the temperature difference $\Delta T_{sf}$ in the flow-calibration-area $B_2$ and in the flow area $B_1$ below the flow-calibration-area $B_2$.

The temperature difference $\Delta T_{sf}$ as a function of the flow Q is given by the following equation $$\Delta T_{sf}(Q) = \Delta T_B\left(1 - e^{-C_1 Q}\right) \tag{1}$$

where $\Delta T_B$ is a temperature difference corresponding to the base flow level $Q_B$ and $C_1$ is a constant.

By performing two measurements $M_1$ and $M_2$, it is possible to determine the two unknowns $\Delta T_B$ and $C_1$ from equation (1).

Therefore, it is possible to determine a flow $Q_{M3}$ in the flow area $B_1$, in which the flow sensor cannot provide any measurements. The flow $Q_{M3}$ can be determined on the basis of a measured temperature difference $\Delta T_{M3}$ detected by the flow sensor. The flow $Q_{M3}$ can be determined by using equation (1) or the following equation defining the flow Q as a function of the detected temperature difference $\Delta T_{sf}$:

$$Q(\Delta T_{sf}) = \frac{-1}{C_1}\ln\left(1 - \frac{\Delta T_{sf}}{\Delta T_B}\right) \tag{2}$$

where $C_1$ is a constant and $\Delta T_B$ is a temperature difference corresponding to the base flow level $Q_B$.

A flow sensor and method according to the present disclosure estimate flows Q below the lower flow level $Q_A$ by measuring the temperature difference $\Delta T_{sf}$ between the surroundings and a fluid flowing through the pipe. The estimation is possible because one or more flow measurements $M_1$, $M_2$ made in the flow-calibration-area $B_2$ are used to determine the unknowns in equation (1) or equation (2). Accordingly, any flow Q in the flow area $B_1$ can be calculated by using equation (2).

In FIG. 1B it can be seen that a first flow $Q_1$ is detected on the basis of a first measured temperature difference $\Delta T_1$. Likewise, FIG. 1B shows that a second flow $Q_2$ is detected on the basis of a second measured temperature difference $\Delta T_2$.

The lower flow level $Q_A$ corresponds to a measured temperature difference $\Delta T_A$. Likewise, the base flow level $Q_B$ corresponds to a higher measured temperature difference $\Delta T_B$.

The temperature difference can be detected by using temperature sensors described herein. This is shown in and explained with reference to FIG. 2A, FIG. 2B, FIG. 3A, FIG. 3B and FIG. 4B.

In an example, in the flow-calibration-area $B_2$, a flow sensor according to the present disclosure used to measure water at 20° C. is applied to make a measurement point $M_2$ corresponding to a flow $Q_{M2}$ of 2 ml/s (which is 0.000002 $m^3/s$) and a temperature difference $\Delta T_{M2}$ of 10° C.

Relationship between the temperature difference $\Delta T_{sf}$ between the surroundings and the fluid and the flow Q is given by equation (2):

$$Q(\Delta T_{sf}) = \frac{-1}{C_1}\ln\left(1 - \frac{\Delta T_{sf}}{\Delta T_B}\right) \tag{2}$$

If $$C_1 = 5.02\frac{\text{min}}{\text{cm}^3} \text{ and } dt_B = 10.02^\circ \text{ C.}$$

one can calculate the following values:

TABLE 1

| $\Delta T_{sf}$ [° C.] | 0.980 | 2.224 | 3.652 | 4.446 |
|---|---|---|---|---|
| Flow [$cm^3$/min] | 0.020 | 0.050 | 0.116 | 0.572 |

In another example, below the lower flow level $Q_A$, the relationship between the temperature difference $\Delta T_{sf}$ and the flow Q is given by the equation (2), where $C_1$=4.88 and $dt_B$=12.54° C. one can calculate the following values:

TABLE 2

| $\Delta T_{sf}$ [° C.] | 1.124 | 2.462 | 3.866 | 5.562 |
|---|---|---|---|---|
| Flow [$cm^3$/min] | 0.019 | 0.045 | 0.076 | 0.120 |

Figure 2A:
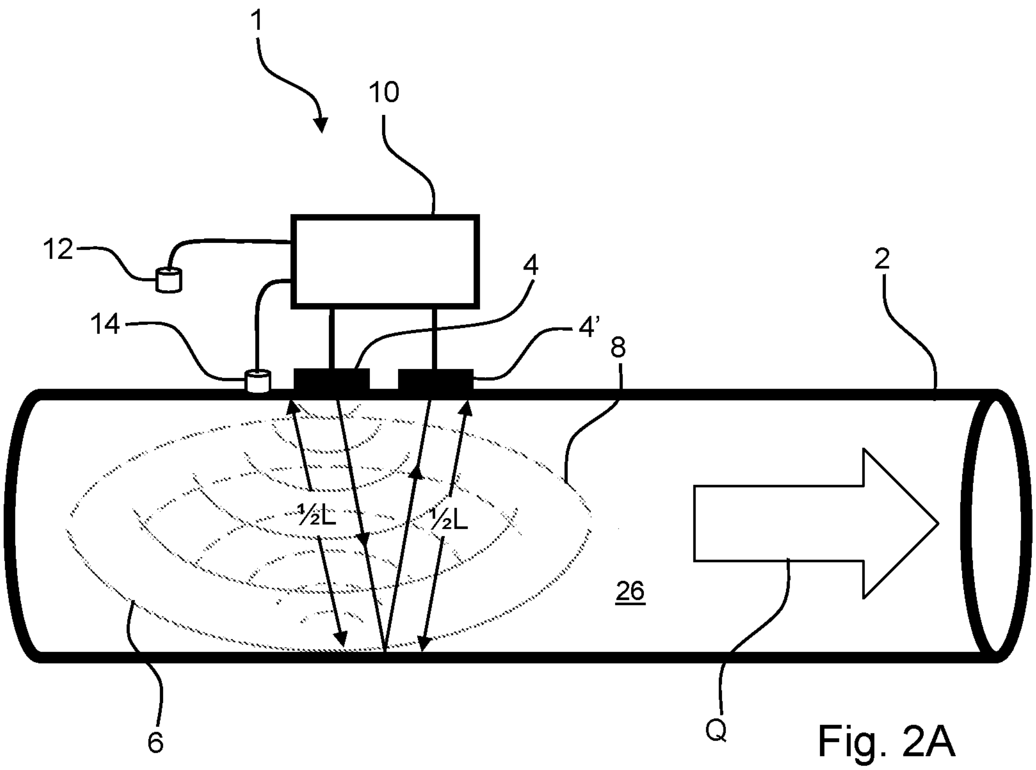
FIG. 2A shows a schematic view of a clamp-on type flow sensor according to an embodiment.

FIG. 2A illustrates a schematic view of a clamp-on type flow sensor 1 according to the present disclosure. The flow sensor 1 is arranged to detect the flow of a fluid 26 (e.g. a liquid) in the pipe 2. The flow sensor 1 comprises a data processor 10.

The flow sensor 1 comprises a first temperature sensor 12 arranged to detect the ambient temperature (the temperature in the surroundings of the pipe 2). The flow sensor 1 comprises a second temperature sensor 14 arranged to detect the temperature of the fluid 26. The flow sensor 1 comprises a first ultrasonic wave generator 4 and a second ultrasonic wave generator 4'. The wave generators are formed as piezo transducers 4, 4' arranged and configured to generate ultrasonic waves, which are introduced into the fluid 26 at an angle to the direction of flow Q. The flow sensor 1 may be either a Doppler effect type flow sensor 1 or a propagation time measuring type flow sensor 1. It is indicated that both ultrasonic waves 6, 8 travel a distance ½ L. Accordingly, the total distance of travel is L.

The piezo transducers 4, 4' are operated as a transducer to detect the flow Q through a pipe by using acoustic waves 6, 8. In an embodiment, the flow sensor 1 comprises several piezo transducers 4, 4' in order to be less dependent on the profile of the flow Q in the pipe 2. The operating frequency may depend on the application and be in the frequency range 100-200 kHz for gases and in a higher MHz frequency range for liquids.

In an embodiment, the flow sensor 1 is a Doppler effect flow sensor 1. In this embodiment, the flow sensor 1 comprises a single piezo transducer only. In this case the second piezo transducer 4' can be omitted and the first piezo transducer 4 is used for both sending ultrasonic waves 6 and for receiving ultrasonic waves 8. In a Doppler effect type flow sensor 1, when the transmitted wave 6 is reflected by particles or bubbles in the fluid, its frequency is shifted due to the relative speed of the particle. The higher the flow speed of the liquid, the higher the frequency shift between the emitted and the reflected wave.

In an embodiment, the flow sensor 1 is a Doppler effect flow sensor 1 that comprises several piezo transducers 4, 4'. In this case one piezo transducer 4 can be used to transmit an ultrasonic wave 6, while the other piezo transducer 4' can be used to receive the reflected ultrasonic wave 8.

In an embodiment, the flow sensor 1 is a propagation type flow sensor 1. In this embodiment, the flow sensor 1 applies two piezo transducers operating as both transmitter and receiver arranged diagonally to the direction of flow Q. Transmission of ultrasonic waves in the flowing medium causes a superposition of sound propagation speed and flow speed. The flow speed proportional to the reciprocal of the difference in the propagation times in the direction of the flow Q and in the opposite direction. The propagation type measuring method is independent of the sound propagation speed and thus also the medium. Accordingly, it possible to measure different liquids or gases with the same settings.

The temperature sensors 12, 14 and the piezo transducers 4, 4' are connected to the data processor 10. Accordingly, the data processor 10 can process data from the temperature sensors 12, 14 and the piezo transducers 4, 4' and hereby detect the flow based on the data.

In FIG. 2A, the second temperature sensor 14 is arranged outside the pipe 2. The second temperature sensor 14 is thermally connected to the pipe 2. Accordingly, the second temperature sensor 14 is capable of measuring the temperature of the pipe 2. The temperature of the pipe 2 will normally correspond to or be very close to the temperature of the fluid 26 in the pipe 2.

In the low flow area below the lower flow level of the flow sensor 1, the flow sensor 1 determines the flow on the basis of the temperature measurements made by the first temperature sensor 12 and the second temperature sensor 14. In fact, below the lower flow level of the flow sensor 1, the flow sensor 1 determines the flow on the basis of the temperature difference $\Delta T_{sf}$ defined as the difference between the temperatures detected by the first temperature sensor 12 and the second temperature sensor 14.

$$\Delta T_{sf} = |T_s - T_f| \tag{9}$$

where $T_s$ is the temperature of the surroundings measured by the first temperature sensor 12 and $T_f$ is the temperature of the fluid 26 measured by the second temperature sensor 14.

Figure 2B:
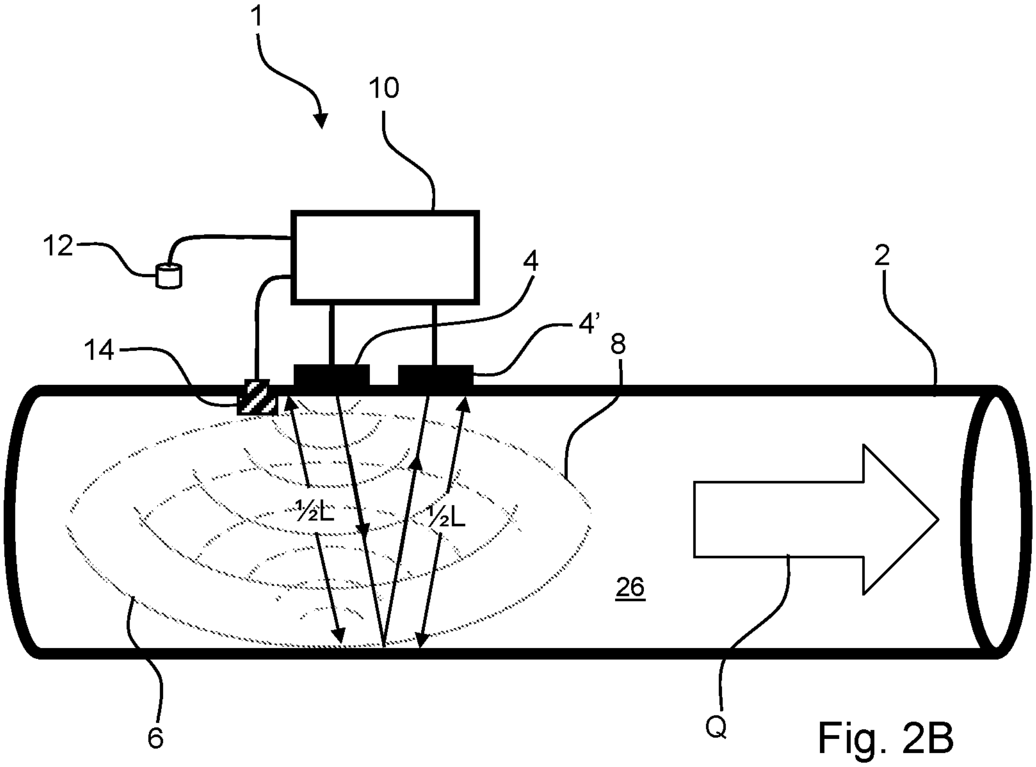
FIG. 2B shows a schematic view of another clamp-on type flow sensor according to an embodiment.

FIG. 2B illustrates a schematic view of a clamp-on type flow sensor 1 according to the present disclosure. The flow senor 1 shown in FIG. 2B basically corresponds to the one shown in FIG. 2A. The temperature sensor 14, however, is in contact with the fluid 26 inside the pipe 2. A structure extends through the wall of the pipe 2. The temperature sensor 14 is connected to the data processor 10 via a wire extending through said structure. It is indicated that both ultrasonic waves 6, 8 travel a distance ½ L. Accordingly, the total distance of travel is L.

FIG. 3A illustrates a schematic view of a heat energy meter 5 according to the present disclosure. The heat energy meter 5 comprises a flow sensor 1 according to the present disclosure. The flow sensor 1 comprises a housing 20 that is attached to a pipe 2. The flow sensor 1 is arranged and configured to detect the flow Q of the fluid 26 (e.g. a water containing liquid) in the pipe 2.

The flow sensor 1 comprises a first temperature sensor 12 arranged to detect the temperature $T_s$ of the surroundings (e.g. the ambient temperature). The flow sensor 1 comprises a second temperature sensor 14 arranged to detect the temperature $T_f$ of the fluid 26 in the pipe 2. The flow sensor 1 comprises a third temperature sensor 16 arranged to detect an intermediate temperature $T_i$ that is expected to have a value between the ambient temperature $T_s$ and the temperature $T_f$ of the fluid 26.

The flow sensor 1 comprises a first ultrasonic wave generator 4 and a second ultrasonic wave generator 4' formed as piezo transducers 4, 4' that are arranged and configured to generate ultrasonic waves transmitted into the fluid 26 at an angle to the direction of flow Q. The piezo transducers 4, 4' are used in the same manner as shown in and explained with reference to FIG. 2A and FIG. 2B.

The flow sensor 1 comprises a data processor 10 connected to the piezo transducers 4, 4' and to the temperature sensors 12, 14, 16. Therefore, the data processor 10 can process data from the temperature sensors 12, 14 and the piezo transducers 4, 4' and hereby detect the flow based on the data.

The third temperature sensor 16 provides temperature measurements that can be applied to provide an improved estimation of the flow below the lower flow level of the flow sensor 1. The improved estimation can be accomplished by using two temperature differences:

the difference $\Delta T_{sf}$ between the surroundings and the fluid 26:

$$\Delta T_{sf} = |T_s - T_f| \text{ and} \tag{10}$$

the temperature difference $\Delta T_{if}$ between the intermediate point in the housing 20 and the fluid 26: (11) $\Delta T_{if}=|T_i-T_f|$ The heat energy meter 5 has an external temperature sensor 17 thermally connected to a pipe 3. By measuring the temperature of the fluid in the supply pipe 3 and the temperature of the fluid 26 in the return pipe 2, it is possible to calculate the consumed heat quantity (heat energy). The external temperature sensor 17 may be connected to the data processor 10 by a wired connection as shown in FIG. 3A or by a wireless connection as shown in FIG. 3B.

FIG. 3B illustrates a schematic view of another heat energy meter 5 according to the present disclosure. The heat energy meter 5 comprises a flow sensor 1 according to the present disclosure. The flow sensor 1 basically corresponds to the one shown in FIG. 3A. The first temperature sensor 12, however, is placed on the outside surface of the housing 20. The heat energy meter 5 has an external temperature sensor 17 that is attached to the outside surface of a supply pipe 3. Accordingly, the temperature sensor 17 is thermally connected to the supply pipe 3. By measuring the temperature of the fluid in the supply pipe 3 and the temperature of the fluid 26 in the return pipe 2, it is possible to calculate the consumed heat quantity (heat energy).

FIG. 4A illustrates a schematic view of a clamp-on type flow sensor 1 according to the present disclosure. The flow sensor 1 is mounted on the outside of a pipe 2. The flow sensor 1 comprises a housing 20 having a contact structure that matches the outer geometry of the pipe 2. A thermal connection structure 22 (e.g. a metal layer) is attached to the contact structure. Hereby, the thermal connection structure 22 reduces the thermal resistance and therefore provides an improved and effective heat transfer between the pipe 2 and the temperature sensors (not shown) of the flow sensor.

In an embodiment, the thermal connection structure is a metal foil, coated with thermal adhesive on each side. Such thermal connection structure is capable of providing a permanent bond and reducing the thermal resistance by filling micro-air voids at the interface. In an embodiment, the thermal connection structure is thermally conductive aluminum tape. The thermal connection structure may be thermally conductive double-sided structural adhesive aluminum tape.

FIG. 4B illustrates a schematic view of a flow sensor according to the present disclosure. The flow sensor comprises a mechanical flow detection unit 24 that is arranged inside a pipe 3 and thus submerged into the fluid 26.

The flow sensor 1 is a positive displacement meter that requires fluid to mechanically displace components of the mechanical flow detection unit 24 in order to provide flow measurements. The mechanical flow detection unit 24 can be a turbine or impeller. The activity and rotational speed of the turbine or impeller can either be determined using a direct connection to a data processor 10 or by a detection member (not shown) arranged and configured to measure the angular velocity of the turbine or impeller. The flow sensor 1 may be a turbine flow meter, a single jet flow meter or a paddle wheel flow meter by way of example. The mechanical flow detection unit 24 constitutes a first detection unit 34. The data processor 10 and the temperature sensors 12, 14 constitute the second detection unit 36.

The flow sensor 1 comprises a first temperature sensor 12 arranged and configured to detect the temperature of the surroundings (the ambient temperature). The flow sensor 1 comprises a second temperature sensor 14 arranged and configured to detect the temperature of the fluid 26 inside the pipe 3. The second temperature sensor 14 bears against the outside portion of the wall of the pipe 3. In another embodiment, however, the second temperature sensor 14 may be arranged inside the pipe 3. In a further embodiment, the second temperature sensor 14 may be integrated into the wall of the pipe 3.

The flow sensor 1 comprises a pipe 3 provided with a first flange 18 and a second flange 18'. These flanges 18, 18' are configured to be mechanically connected to corresponding flanges 19, 19' of two pipes 2, 2'. In an embodiment, the flanges 18, 18' are replaced with similar attachment structures designed to attach the flow sensor 1 to pipes 2, 2'.

In an embodiment, the distal portions of the pipes 2, 2' are provided outer threads while the distal portions of the pipe 3 of the flow sensor are provided with corresponding inner threads allowing the pipe 3 to be screwed onto the pipes 2, 2'.

In an embodiment, the distal portions of the pipes 2, 2' are provided inner threads while the distal portions of the pipe 3 of the flow sensor are provided with corresponding outer threads allowing the pipe 3 to be screwed onto the pipes 2, 2'.

FIG. 5A illustrates a schematic view of a flow sensor 1 according to the present disclosure. The flow sensor 1 basically corresponds to the one shown in FIG. 3A.

FIG. 5B illustrates a schematic view of a flow sensor 1 according to the present disclosure. The flow sensor 1 basically corresponds to the one shown in FIG. 3B.

In FIG. 5A and FIG. 5B, the housing 20, however, comprises a portion that bears against the pipe 2, while the second temperature sensor 14 as well as the piezo transducers 4, 4' extend through said portion of the housing 20 in order to be directly connected to the outside portion of the pipe 2, when the flow sensor 1 is attached to the pipe 2. It is possible to apply clamping structures such as cable tie or hose clamps to clamp the flow sensor to the pipe 2.

The piezo transducers 4, 4' constitute a first detection unit 34. The data processor 10 and the temperature sensors 12, 14, 16 constitute a second detection unit 36.

A flow sensor 1 according to the present disclosure uses the fact that the fluid 26 in most cases transports heat between the physical zones it flows through and that these physical zones have different temperatures. By detecting the temperature difference between these zones, it is possible to provide an alternative measure for the flow rate.

Accordingly, a flow sensor 1 and a method according to the present disclosure can detect flow in the low flow range, in which the prior art flow sensors cannot detect any flow.

Moreover, a flow sensor 1 and a method according to the present disclosure can provide an improved (more accurate) flow detection in general by using the temperature difference between the above-mentioned zones.

The heat transfer rate q (corresponding to E/t) from the fluid to the surroundings is defined in the following equation (12):

$$q = UA\Delta T_{sf} \tag{12}$$

where $\Delta T_{sf}$ is the temperature difference between the surroundings and the fluid 26; A is the surface area where the heat transfer takes place and U is the heat transfer coefficient.

The heat transfer coefficient U is defined in the following equation (13):

$$U = \frac{k}{s}, \tag{13}$$

where k is the thermal conductivity of the material through which the heat transfer takes place and s is the thickness of the material through which the heat transfer takes place.

The working principle of a Doppler Effect flow sensor 1 is shown in and briefly explained with reference to FIG. 6A. Doppler Effect flow sensors are affected by changes in the sonic velocity of the fluid 26. Accordingly, Doppler Effect flow sensors are sensitive to changes in density and temperature of the fluid 26. Therefore, many prior art Doppler Effect flow sensors are unsuitable for highly accurate measurement applications. The present disclosure, however, makes it possible to detect the temperature and speed of sound of the fluid 26 and compensate for temperature and fluid (density) changes and thus provide an improved accuracy. Likewise, the present disclosure, makes it possible to detect the density of the fluid 26 (via measurement made on a sample of the fluid 26) and compensate for temperature and/or fluid (density) changes in order to even further improve the accuracy of the flow sensor 1.

The Doppler Effect flow sensor 1 is a time-of-flight ultrasonic flow sensor that measures the time for the sound to travel between a transmitter 4 and a receiver 4'. In a typical setup, like the one illustrated in FIG. 6A, two transducers (transmitters/receivers) 4, 4' are placed on each side of the pipe 2 through which the flow Q is to be measured. The transmitters 4, 4' transmit pulsating ultrasonic waves 6 in a predefined frequency from one side to the other. The average fluid velocity V is proportional to the difference in frequency.

Accordingly, the fluid velocity V can be expressed as:

$$V = \frac{t_2 - t_1}{t_1 t_2} \frac{L}{2\cos(\phi)} \tag{14}$$

where $t_1$ is the transmission time for the transmission time downstream, $t_2$ is the transmission time upstream, L is the distance between the transducers and $\phi$ is the relative angle between the transmitted ultrasonic beam 6 and the fluid flow Q.

The flow Q can be calculated as the product between the fluid velocity V and the cross-sectional area $A_{pipe}$ of the pipe 2:

$$Q = VA_{pipe} \tag{15}$$

At the same time the speed of sound c is given by the following equation:

$$c = \frac{L}{2} \frac{t_2 + t_1}{t_2 t_1} \tag{16}$$

Figure 6A:
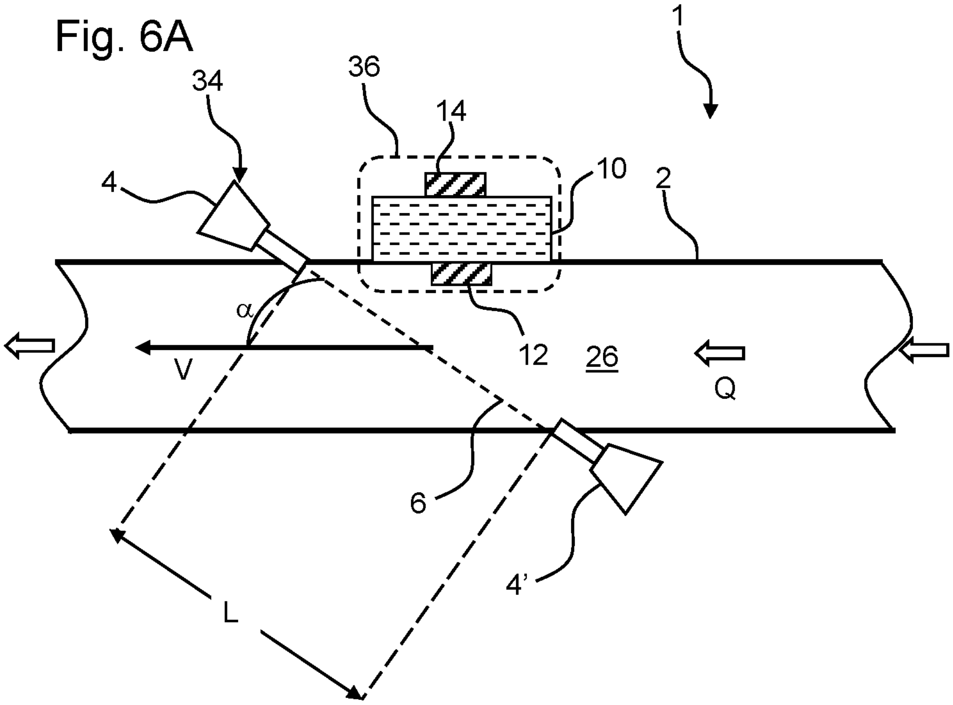
FIG. 6A shows a schematic view of a flow sensor according to an embodiment.

The flow sensor 1 shown in FIG. 6A comprises a first temperature sensor 12 arranged to detect the ambient temperature (the temperature in the surroundings of the pipe 2. The flow sensor 1 comprises a second temperature sensor 14 arranged to detect the temperature of the fluid 26. The flow sensor 1 comprises a data processor 10. Even though it is not shown in FIG. 6B, the temperature sensors 12, 14 and the two transducers 4, 4' are connected to the data processor 10. Accordingly, the data processor 10 can process data and calculate the flow Q based on data from the temperature sensors 12, 14 and the two transducers 4, 4'.

Figure 6B:
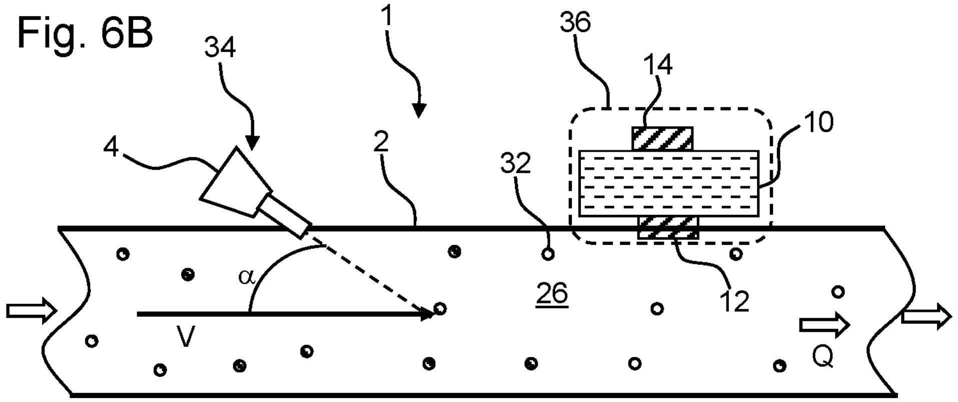
FIG. 6B shows a schematic view of another flow sensor according to an embodiment.

The working principle of a Doppler Effect flow sensor 1 measuring the flow in a fluid containing particles 32 is shown in and briefly explained with reference to FIG. 6B.

The fluid velocity V can be calculated by using the following equation (17):

$$V = \frac{c(fr - ft)}{2ft\cos(\phi)}, \tag{17}$$

where fr is the frequency of the received wave; ft is the frequency of the transmitted wave; $\phi$ is the relative angle between the transmitted ultrasonic beam and the fluid flow Q and c is the velocity of sound in the fluid 26.

The flow Q can be calculated as the product between the fluid velocity V and the cross-sectional area $A_{pipe}$ of the pipe 2:

$$Q = VA_{pipe}. \tag{15}$$

Equations 15 and 16 can also be used when calculating the flow by using the flow sensor shown in FIG. 2A, FIG. 2B, FIG. 3A and FIG. 3B.

Figure 7:
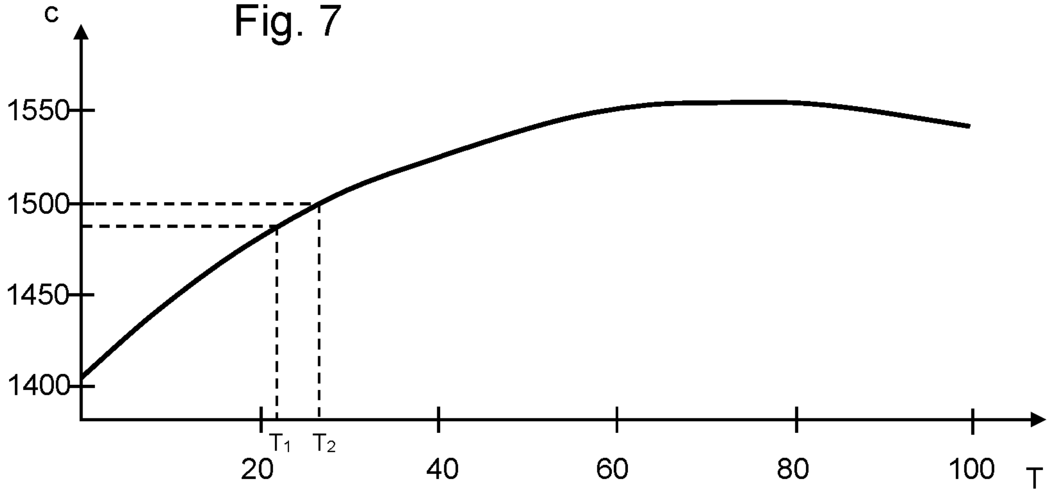
FIG. 7 shows a graph depicting the speed of sound in water as a function of the temperature of the water.

FIG. 7 illustrates a graph depicting the speed of sound c in water as a function of the temperature T of the water. Similar graphs can, however, be made for other liquids. In the following, water is just representing one possible fluid and water may be replaced with another liquid.

If the dimensions of the tubular structure (e.g. pipe, through which a flow Q of water is flowing, are not known, an estimation of the distance L that the sound travels in the water is needed. This problem is in particular relevant for ultrasonic clamp-on sensors. Over time, sediments may be provided at an inside surface of a pipe. This will gradually decrease the distance L. Accordingly, the systems and methods make it possible to use an estimation of the distance L under such conditions.

By determining the speed of sound c in the water, it is possible to estimate the distance L and hereby improve the accuracy of the detected speed V and flow Q of the water. Accordingly, changes in the speed of sound c in the water are highly relevant.

When the speed of sound c is detected, it is possible to calculate the distance L that the sound travels in the water.

The speed of sound c is given by the following formula:

$$c = \sqrt{\frac{K}{\rho}} \tag{18}$$

where K is the Bulk Modulus of Elasticity and ρ is the density.

Since the density of water depends on the temperature T, the speed of sound c depends on the temperature T. Moreover, the speed of sound c depends on the concentration of substances (e.g. glycol) in the water.

When the inclination angle α is known, the average speed V of the water (in the tube measured by delta time of flight) can be obtained using the following equation (19):

$$V = \frac{L}{2\cos(\phi)} \frac{t_2 - t_1}{t_2 t_1} \tag{19}$$

when the speed of sound c is known. L can be calculated or estimated by using the following equation (since $t_1$ and $t_2$ are being measured).

$$c = \frac{L}{2} \frac{t_2 + t_1}{t_2 t_1} \tag{16}$$

Accordingly, the flow Q can be calculated as the product between the average speed V of water and the cross-sectional area $A_{pipe}$ of the pipe 2:

$$Q = VA_{pipe} \tag{15}$$

The measured fluid temperature T and the measured time-of-flight can be used to determine the density p and the speed of sound c by using equation (18).

If the flow sensor is calibrated in pure water at a temperature $T_2$ of 26° C., FIG. 7 shows that the speed of sound $c(T_2)$ is 1500 m/s. If a lower temperature $T_1$ of 21.5° C. is detected, the speed of sound $c(T_1)$ is 1485 m/s. Accordingly, by calibrating the flow sensor by using a fluid (e.g. a liquid such as water) at a known temperature T and density ρ, a simple temperature measurement is sufficient to detect the speed of sound c by using equation (18).

$$c = \sqrt{\frac{K}{\rho}} \tag{18}$$

The specific heat capacity of the fluid (e.g. water) depends on the content of additional substances (e.g. sugar, salt, ethylene glycol, glycerol or propylene glycol).

When the speed of sound c is known, it is possible to calculate the specific heat capacity of the fluid (e.g. water) having additional substances on the basis of the detected density of the fluid. Hereby, it is possible to make a heat energy meter having a flow sensor according to the present disclosure more accurate.

It may be an advantage to measure content of additional substances (e.g. sugar, salt, ethylene glycol, glycerol or propylene glycol). Hereby, it would be possible to calibrate the flow sensor on the basis of the measurements.

EXAMPLE 1

If the flow sensor being used in pure water detects a flow Q of 1 liter/minute at a temperature $T_2$ of 26° C., FIG. 7 shows that the speed of sound $c(T_2)$ is 1500 m/s.

When the speed of sound c (1500 m/s) is known. L can be calculated by using the following equation (since $t_1$ and $t_2$ are detected by the flow sensor).

$$c = \frac{L}{2} \frac{t_2 + t_1}{t_2 t_1} \tag{16}$$

When the flow sensor is used at a later point in time, the expected speed of sound c, at the same temperature $T_2$ of 26° C. would be 1500 m/s. If, however, the detected speed of sound c is 1485 m/s calculated by using equation (16) and the known L, the decreased speed of sound is approximately 1%. This may be caused by a change in the density p of the water. If we presume that the Bulk Modulus of Elasticity K is constant, equation (18) will give us that the density p is increased by approximately 2% (by using equation 18).

If the flow sensor is used in a heat energy meter, it would be possible to correct the specific heat capacity of the water based on the detected density of the water. It can be concluded that the content of additional substances (e.g. sugar, salt, ethylene glycol, glycerol or propylene glycol) has increased. Accordingly, it is possible to improve the accuracy of the heat energy meter. This is relevant since the content of additional substances (e.g. sugar, salt, ethylene glycol, glycerol or propylene glycol) may vary as a function of time. If the flow sensor is configured to automatically detect changes in the density of the fluid, the flow sensor is used in a heat energy meter will be capable of providing a high accuracy even when the content of additional substances varies over time.

Figure 8:
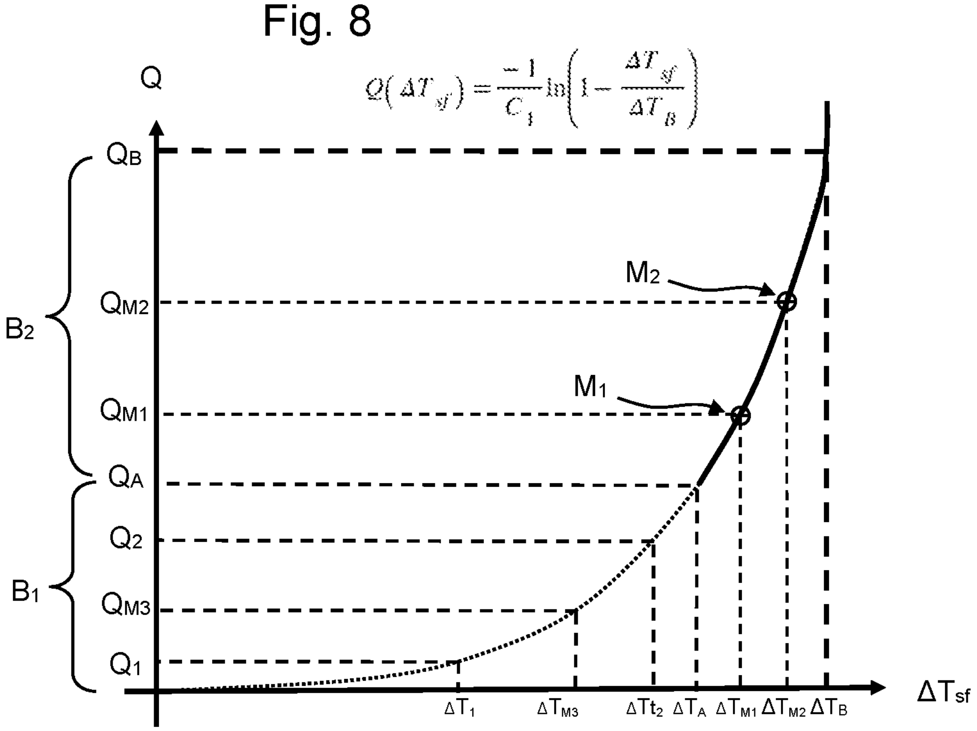
FIG. 8 shows the flow as a function of the temperature difference.

FIG. 8 illustrates a graph depicting the flow Q detected by a flow sensor according to the present disclosure as a function of the temperature difference $\Delta T_{sf}$.

The lower flow level $Q_A$ represents the lowest flow that can be measured using prior art flow sensors. Prior art flow sensors are not capable of detecting flow below the lower flow level $Q_A$, flow sensors and methods according to the present disclosure, however, are capable of providing flow measurements below this lower flow level $Q_A$.

Above a base flow level $Q_B$ the graph shows that the temperature difference $\Delta T_{sf}$ is constant and thus independent of the flow Q.

In the flow-calibration-area $B_2$ between the lower flow level $Q_A$ and the base flow level $Q_B$ the temperature difference $\Delta T_{sf}$ increases as a function of the flow Q. In this flow-calibration-area $B_2$, a first flow sensor measurement $M_1$ and a second flow sensor measurement $M_2$ are indicated.

These flow sensor measurements $M_1$ and $M_2$ are made in the flow-calibration-area $B_2$ in order to determine the parameters required to determine how the flow Q depends on the temperature difference $\Delta T_{sf}$ in the flow-calibration-area $B_2$ and in the flow area $B_1$ below the flow-calibration-area $B_2$. The relationship between the flow Q and temperature difference $\Delta T_{sf}$ is given by equation:

$$Q(\Delta T_{sf}) = \frac{-1}{C_1}\ln\left(1 - \frac{\Delta T_{sf}}{\Delta T_B}\right) \quad (2)$$

It is possible to measure temperature differences $\Delta T_1$, $\Delta T_{M3}$ and $\Delta T_2$ and calculate the flow Q by using equation (2).

LIST OF REFERENCE NUMERALS

1 Flow sensor
2, 2', 3 Pipe
4, 4' Ultrasonic transducer (piezo transducer)
5 Heat energy meter
6 Ultrasonic vibration wave
8 Reflected ultrasonic vibration wave
10 Data processor (e.g. a micro-processor)
12 Temperature sensor
14 Temperature sensor
16 Temperature sensor
17 Temperature sensor
18, 18' Flange
19, 19' Flange
20 Housing
22 Thermal connection structure (e.g. a metal layer)
24 Mechanical flow detection unit
26 Fluid
28 Graph
30 Low flow area
32 Particle
34, 36 Detection unit
$T_s$ Temperature of the surroundings
$T_f$ Temperature of the fluid
$\Delta T$ Temperature difference
$\Delta T_{sf}$ Temperature difference between the surroundings and the fluid
$\Delta T_1$, $\Delta T_2$ Temperature difference
$\Delta T_A$, $\Delta T_B$ Temperature difference
$T_1$, $T_2$ Temperature
$M_1$, $M_2$, $M_3$ Flow measurement
$B_1$ Flow area
$B_2$ Flow-calibration-area
$c_p$ Specific heat capacity
k Thermal conductivity
U Coefficient of heat transfer
A Surface area
W Volume
t Time-of-flight
t' Temperature compensated time-of-flight
$\Delta t$ Delta-time-of-flight
$t_1$, $t_2$ Time-of-flight
$\Delta T_1$, $\Delta T_2$ Temperature difference
$\Delta T_A$, $\Delta T_B$ Temperature difference
$\Delta T_{M1}$, $\Delta T_{M2}$ Temperature difference
$\Delta T_{M3}$ Temperature difference
d Thickness
Q Flow
$Q_1$, $Q_2$ Flow
$Q_A$, $Q_B$ Flow
$Q_{M1}$, $Q_{M2}$ Flow
$Q_{M3}$ Flow
V Fluid velocity
$\alpha$ Angle
L Distance

What is claimed is:

1. A flow sensor configured to measure flow (Q) of a fluid flowing through a tubular structure, wherein the flow sensor comprises a first detection unit that is configured to detect flows (Q) above a predefined lower flow level ($Q_A$) representing a lowest flow ($Q_A$) that can be measured using the first detection unit, wherein the flow sensor comprises a second detection unit that comprises:

(i) a first temperature sensor arranged and configured to detect a temperature ($T_s$) of surroundings;

(ii) a second temperature sensor arranged and configured to detect a temperature ($T_f$) of the fluid;

(iii) a data processor connected to the first and second temperature sensors, wherein the second detection unit is configured to estimate a flow (Q) below the lower flow level ($Q_A$) based on a temperature difference ($\Delta T_{sf}$) between the surroundings and the fluid, measured by the first and second temperature sensors, wherein the second detection unit is further configured to estimate the flow (Q) below the lower flow level ($Q_A$) based on one or more flow measurements ($M_1$, $M_2$) made in a flow-calibration-area ($B_2$) in which the flow sensor can detect a flow (Q) that depends on the temperature difference ($\Delta T_{sf}$), and wherein the one or more measurements ($M_1$, $M_2$) made in the flow-calibration-area ($B_2$) are used to determine one or more parameters required to determine how the flow (Q) depends on the temperature difference ($\Delta T_{sf}$) in the flow-calibration-area ($B_2$) and in a flow area ($B_1$) having a flow (Q) below the lower flow level ($Q_A$) in the flow-calibration-area ($B_2$).

2. A flow sensor according to claim 1, wherein the flow sensor is configured to regularly or continuously:

(i) carry out the one or more measurements ($M_1$, $M_2$) in the flow-calibration-area ($B_2$); and (ii) update the one or more parameters required to determine how the flow (Q) depends on the temperature difference ($\Delta T_{sf}$) in the flow-calibration-area ($B_2$) and in the flow area ($B_1$) having a flow (Q) below the lower flow level ($Q_A$) in the flow-calibration-area ($B_2$).

3. The flow sensor according to claim 1, wherein a dependency between the flow (Q) and the temperature difference ($\Delta T_{sf}$) is defined by one of the following equations:

$$\Delta T_{sf}(Q) = \Delta T_B(1 - e^{-C_1 Q}) \text{ or } Q(\Delta T_{sf}) = \frac{-1}{C_1}\ln\left(1 - \frac{\Delta T_{sf}}{\Delta T_B}\right)$$

where $C_1$ is a constant and $\Delta T_B$ is a temperature difference corresponding to a base flow level.

4. The flow sensor according to claim 1, wherein the second temperature sensor is arranged and configured to detect the temperature ($T_f$) of the fluid by measuring a temperature at an outside of the tubular structure.

5. The flow sensor according to claim 1, wherein the data processor, the first temperature sensor and the second temperature sensor are arranged inside a housing.

6. The flow sensor according to claim 1, wherein the data processor and the second temperature sensor are arranged inside a housing and the first temperature sensor is arranged outside the housing.

7. The flow sensor according to claim 1, wherein the flow sensor is a clamp-on flow sensor configured to measure the flow (Q) of the fluid from outside the tubular structure.

8. The flow sensor according to claim 1, wherein the flow sensor is an ultrasonic flow sensor and the first detection unit comprises at least one ultrasonic transducer arranged to transmit ultrasonic waves and at least one ultrasonic transducer arranged to receive the ultrasonic waves.

9. The flow sensor according to claim 8, wherein the flow sensor is configured to:

(i) determine a time-of-flight (t, $t_1$, $t_2$) of the ultrasonic waves and calculate a change in a speed of sound based on the time-of-flight (t, $t_1$, $t_2$);

(ii) calculate an expected change in the speed of sound as a function of the detected temperature ($T_f$) of the fluid; and (iii) determine if the expected change in the speed of sound corresponds to the change in speed of sound calculated based on the time-of-flight (t, $t_1$, $t_2$).

10. The flow sensor according to claim 9, wherein the ultrasonic flow sensor is configured to calculate one or more of:

(i) a corrected value of density (ρ) of the fluid based on the change in the speed of sound calculated based on the time-of-flight (t, $t_1$, $t_2$), if the expected speed of sound does not correspond to the change in speed of sound calculated based on the time-of-flight (t, $t_1$, $t_2$);

(ii) a corrected value of specific heat capacity ($c_p$) of the fluid based on the corrected value of the density (ρ), if the expected change in the speed of sound does not correspond to the change in the speed of sound calculated on based on the time-of-flight (t, $t_1$, $t_2$); and (iii) a corrected value of the flow of the fluid based on the change in the speed of sound calculated based on the time-of-flight (t, $t_1$, $t_2$), if the expected change in the speed of sound does not correspond to the change in the speed of sound calculated based on the time-of-flight (t, $t_1$, $t_2$).

11. A method for measuring a flow (Q) of a fluid flowing through a tubular structure using a first detection unit that is configured to detect flows (Q) above a predefined lower flow level ($Q_A$) representing a lowest flow ($Q_A$) that can be measured using the first detection unit, wherein the method comprises the steps of applying a second detection unit to:

(i) detect a temperature ($T_s$) of surroundings by a first temperature sensor;

(ii) detect a temperature ($T_f$) of the fluid by a second temperature sensor;

(iii) estimate a flow (Q) below the lower flow level ($Q_A$) based on a temperature difference ($\Delta T_{sf}$) between the surroundings and the fluid measured by the first temperature sensor and the second temperature sensor, wherein the method comprises the following steps:

a) performing one or more flow measurements ($M_1$, $M_2$) by the first detection unit in a flow-calibration-area ($B_2$) where the flow sensor can detect a flow (Q) that depends on the temperature difference ($\Delta T_{sf}$);

b) applying the one or more of the flow measurements ($M_1$, $M_2$) made in the flow-calibration-area ($B_2$) to determine one or more parameters required to determine how a flow (Q) depends on the temperature difference ($\Delta T_{sf}$) in the flow-calibration-area ($B_2$) and in a flow area ($B_1$) having a flow (Q) below the lower flow level ($Q_A$) in the flow-calibration-area ($B_2$); and c) estimating the flow (Q) below the lower flow level ($Q_A$) based on the one or more measurements ($M_1$, $M_2$) made in the flow-calibration-area ($B_2$).

12. The method according to claim 11, further comprising regularly or continuously:

(i) carrying out the one or more measurements ($M_1$, $M_2$) in the flow-calibration-area ($B_2$); and (ii) updating the one or more parameters required to determine how the flow (Q) depends on the temperature difference ($\Delta T_{sf}$) in the flow-calibration-area ($B_2$) and in the flow area ($B_1$) having a flow (Q) below the lower flow level ($Q_A$) in the flow-calibration-area ($B_2$).

13. The method according to claim 11, wherein the second temperature sensor is arranged and configured to detect the temperature ($T_f$) of the fluid by measuring a temperature outside of the tubular structure.

14. The method according to claim 11, further comprising measuring a density and/or an estimated inhomogeneity of the fluid prior to measuring the flow (Q).

15. The method according to claim 11, wherein the method is carried out by an ultrasonic flow sensor and the first detection unit comprises at least one ultrasonic transducer arranged to transmit ultrasonic waves and at least one ultrasonic transducer arranged to receive the ultrasonic waves.

16. The method according to claim 15, further comprising:

(i) determining a time-of-flight (t, $t_1$, $t_2$) of the ultrasonic waves;

(ii) calculating a change in speed of sound based on the time-of-flight (t, $t_1$, $t_2$);

(iii) calculating an expected change in the speed of sound as a function of the detected temperature ($T_f$) of the fluid; and (iv) determining if the expected change in the speed of sound corresponds to the change in the speed of sound calculated based on the time-of-flight (t, $t_1$, $t_2$).

17. The method according to claim 16, further comprising calculating one or more of:

(i) a corrected value of density (ρ) of the fluid based on the change in the speed of sound calculated based on the time-of-flight (t, $t_1$, $t_2$), if the expected speed of sound does not correspond to the change in the speed of sound calculated based on the time-of-flight (t, $t_1$, $t_2$);

(ii) a corrected value of specific heat capacity ($c_p$) of the fluid based on the corrected value of the density (ρ), if the expected change in the speed of sound does not correspond to the change in the speed of sound calculated based on the time-of-flight (t, $t_1$, $t_2$); and (iii) a corrected value of the flow (Q) of the fluid based on the change in the speed of sound calculated based on the time-of-flight (t, $t_1$, $t_2$), if the expected change in the speed of sound does not correspond to the change in the speed of sound calculated based on the time-of-flight (t, $t_1$, $t_2$).

18. The method according to claim 11, wherein the method is carried out using a clamp-on flow sensor configured to measure the flow (Q) of the fluid from outside the tubular structure.

19. The method according to claim 11, further comprising estimating a heat energy in a heating system or a cooling system.

20. A heat energy meter comprising a sensor according to claim 1.

* * * * *